United States Patent
Nguyen et al.

(10) Patent No.: US 10,476,313 B2
(45) Date of Patent: Nov. 12, 2019

(54) FOREIGN OBJECT DETECTION IN A WIRELESS POWER TRANSFER SYSTEM

(71) Applicant: DENSO CORPORATION, Kariya, Aichi-pref. (JP)

(72) Inventors: Trong Duy Nguyen, Novi, MI (US); Christopher Jeffery White, Lasalle (CA)

(73) Assignee: DENSO CORPORATION, Kariya, Aichi-pref. (JP)

( * ) Notice: Subject to any disclaimer, the term of this patent is extended or adjusted under 35 U.S.C. 154(b) by 162 days.

(21) Appl. No.: 15/416,443

(22) Filed: Jan. 26, 2017

(65) Prior Publication Data

US 2018/0212476 A1 Jul. 26, 2018

(51) Int. Cl.
| | |
|---|---|
| H02J 50/60 | (2016.01) |
| H02J 50/10 | (2016.01) |
| H02J 7/02 | (2016.01) |
| B60L 11/18 | (2006.01) |
| H01F 38/14 | (2006.01) |
| B60L 53/124 | (2019.01) |
| B60L 53/00 | (2019.01) |

(Continued)

(52) U.S. Cl.
CPC ............ *H02J 50/60* (2016.02); *B60L 53/124* (2019.02); *H01F 38/14* (2013.01); *H02J 7/025* (2013.01); *H02J 50/10* (2016.02); *B60L 53/00* (2019.02); *B60L 53/10* (2019.02); *B60L 53/12* (2019.02)

(58) Field of Classification Search
CPC ........ H02J 50/60; B60L 53/124; B60L 53/12; B60L 53/10; B60L 53/00
USPC ........................................... 307/104
See application file for complete search history.

(56) References Cited

U.S. PATENT DOCUMENTS

| | | |
|---|---|---|
| 2013/0069441 A1 | 3/2013 | Verghese et al. |
| 2013/0193771 A1 | 8/2013 | Teggatz |

(Continued)

FOREIGN PATENT DOCUMENTS

| | | |
|---|---|---|
| WO | WO-2012004092 A2 | 1/2012 |
| WO | WO-2014063159 A2 | 4/2014 |

OTHER PUBLICATIONS

Philip A Laplante, Comprehensive dictionary of electrical terms, p. 190 (Year: 2005).*

*Primary Examiner* — Rexford N Barnie
*Assistant Examiner* — Elim Ortiz
(74) *Attorney, Agent, or Firm* — Harness, Dickey & Pierce, P.L.C.

(57) ABSTRACT

A wireless power transfer system includes a transmitter with a transmitting coil, a first detection coil, and a second detection coil. The transmitting coil receives and wirelessly radiates power from a power supply to a receiver of a vehicle. In response to the radiated power from the transmitting coil, the first detection coil generates a first voltage, and the second detection coil generates a second voltage. A comparison system is electrically coupled to the transmitter. The comparison system declares presence of a foreign object in proximity to the transmitter in response to a difference between the first voltage and a first reference voltage exceeding a threshold value. The comparison system declares the presence of the foreign object in response to a difference between the second voltage and a second reference voltage exceeding the threshold value. The transmitter is selectively disabled in response to presence of the foreign object being declared.

14 Claims, 11 Drawing Sheets

(51) Int. Cl.
*B60L 53/10* (2019.01)
*B60L 53/12* (2019.01)

(56) References Cited

U.S. PATENT DOCUMENTS

| | | |
|---|---|---|
| 2013/0257168 A1 | 10/2013 | Singh |
| 2013/0264887 A1* | 10/2013 | Arisawa ............... G01D 5/2006 307/104 |
| 2014/0015329 A1* | 1/2014 | Widmer ............... G01D 5/2006 307/104 |
| 2014/0015334 A1 | 1/2014 | Jung et al. |
| 2015/0137801 A1 | 5/2015 | Raedy et al. |

* cited by examiner

FOREIGN OBJECT DETECTION IN A WIRELESS POWER TRANSFER SYSTEM

FIELD

The present disclosure relates to foreign object detection in wireless power transfer systems.

BACKGROUND

This section provides background information related to the present disclosure and is not necessarily prior art.

In an effort to reduce fossil fuel emissions and other pollutants emitted from vehicles that use internal combustion engines, hybrid electric vehicles (HEV) and electric vehicles (EV) have been designed and implemented to mitigate the environmental effects of the internal combustion engine. In order to provide power to these battery systems, the HEV and EV may be connected to an electrical grid using a copper cable. Typically, the copper cable will have one end that has a plug for connecting the battery system to connect to the electrical grid.

The battery system of an HEV or EV may also connect to the electrical grid by implementing a wireless or contactless power transfer system. A wireless power transfer (WPT) system may use the mutual inductance between two inductive coils to provide power to the battery system of the HEV or EV. The electrical grid may provide a voltage to the first coil and, as a result of the inductive coupling between the first coil and the second coil, the second coil will induce a voltage and subsequently charge the battery system of the HEV or EV.

During the operation of the WPT system, the presence of a foreign object, such as a can, coin, paper clip, aluminum foil, etc., may adversely affect the safety, reliability, and efficiency of the WPT system. As such, there is a need for a foreign object detection system for a WPT system.

SUMMARY

This section provides a general summary of the disclosure, and is not a comprehensive disclosure of its full scope or all of its features.

A wireless power transfer system includes a transmitter that includes a transmitting coil, a first detection coil, and a second detection coil. The transmitting coil is configured to receive and wirelessly radiate power from a power supply to a receiver of a vehicle. The first detection coil is configured to generate a first voltage in response to the radiated power from the transmitting coil. The second detection coil is configured to generate a second voltage in response to the radiated power from the transmitting coil. A comparison system electrically coupled to the transmitter. The comparison system is configured to declare presence of a foreign object in proximity to the transmitter in response to a difference between the first voltage and a first reference voltage exceeding a threshold value. The comparison system is configured to declare the presence of the foreign object in response to a difference between the second voltage and a second reference voltage exceeding the threshold value. The transmitter is selectively disabled in response to presence of the foreign object being declared.

In other features, the comparison system includes a first differential operational amplifier configured to output a signal based on the difference between the first voltage and the first reference voltage. A second differential operational amplifier configured to output a signal based on the difference between the second voltage and the second reference voltage. In other features, the comparison system includes a voltage regulator configured to generate a limited signal by limiting a voltage of the signal from the first differential operational amplifier and a logic gate configured to receive the limited signal. In other features, the comparison system includes a second voltage regulator configured to generate a second limited signal by limiting a voltage of the signal from the second differential operational amplifier. The logic gate is configured to receive the second limited signal and generate an output based on the limited signal and the second limited signal. In other features, the comparison system includes a unity-gain amplifier electrically connected in series between the first differential operational amplifier and the voltage regulator. In other features, the comparison system includes a reference voltage generator configured to generate the first reference voltage.

In other features, the comparison system includes a microcontroller configured to, by instructions stored in non-transitory memory, calculate the difference between the first voltage and the first reference voltage and calculate the difference between the second voltage and the second reference voltage. In other features, the microcontroller is configured to generate a first signal in response to the difference between the first voltage and the first reference voltage exceeding the threshold value and generate a second signal in response to the difference between the second voltage and the second reference voltage exceeding the threshold value. In other features, the microcontroller implements a logical operation that declares the presence of the foreign object in response to either or both of: the first signal being generated and the second signal being generated. In other features, the comparison system is configured to, in response to presence of the foreign object being declared, at least one of (i) sound an audible alarm, (ii) actuate a visual alarm, and (iii) transmit an alert to an operator of the vehicle.

A wireless power transfer method includes receiving and wirelessly radiating power, with a transmitting coil of a transmitter, from a power supply to a receiver of a vehicle. The method includes generating, with a first detection coil of the transmitter, a first voltage in response to the radiated power from the transmitting coil. The method includes generating, with a second detection coil of the transmitter, a second voltage in response to the radiated power from the transmitting coil. The method includes declaring, with a comparison system electrically coupled to the transmitter, presence of a foreign object in proximity to the transmitter in response to a difference between the first voltage and a first reference voltage exceeding a threshold value. The method includes declaring, with the comparison system, the presence of the foreign object in response to a difference between the second voltage and a second reference voltage exceeding the threshold value. The method includes disabling the transmitter in response to presence of the foreign object being declared.

In other features, the method includes outputting, with a first differential operational amplifier of the comparison system, a signal based on the difference between the first voltage and the first reference voltage. The method includes outputting, with a second differential operational amplifier of the comparison system, a signal based on the difference between the second voltage and the second reference voltage. In other features, the method includes generating, with a voltage regulator of the comparison system, a limited signal by limiting a voltage of the signal from the first differential operational amplifier. The method includes receiving, with a logic gate of the comparison system, the limited signal. In other features, the method includes generating, with a second voltage regulator of the comparison system, a second limited signal by limiting a voltage of the signal from the second differential operational amplifier. The method includes receiving, with the logic gate, the second limited signal. The method includes generating, with the logic gate, an output based on the limited signal and the second limited signal. In other features, the comparison system includes a unity-gain amplifier electrically connected in series between the first differential operational amplifier and the voltage regulator. In other features, the method includes generating, with a reference voltage generator of the comparison system, the first reference voltage.

In other features, the method includes using a microcontroller of the comparison system for calculating, using instructions stored in non-transitory memory, the difference between the first voltage and the first reference voltage. The method includes calculating the difference between the second voltage and the second reference voltage. In other features, the method includes generating, with the microcontroller, a first signal in response to the difference between the first voltage and the first reference voltage exceeding the threshold value. The method includes generating, with the microcontroller, a second signal in response to the difference between the second voltage and the second reference voltage exceeding the threshold value. In other features, the method includes implementing, with the microcontroller, a logical operation that declares the presence of the foreign object in response to either or both of: the first signal being generated and the second signal being generated. In other features, the method includes in response to presence of the foreign object being declared, the comparison system performs at least one of (i) sounding an audible alarm, (ii) actuating a visual alarm, and (iii) transmitting an alert to an operator of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Generally, a magnetic field of a first coil, which is generated in response to a voltage applied to the first coil, is symmetrical around its center. However, a foreign object that is located within the magnetic field may generate an eddy current when voltage is applied to the first coil. As such, the magnetic field generated by the foreign object may oppose the magnetic field of the first coil, thereby reducing the net magnetic field strength and overall efficiency of the wireless power transfer system.

To detect a foreign object within the wireless power transfer system, at least one pair of detection coils may be implemented into the WPT system. When a foreign object is located within the magnetic field of one coil of the pair of detection coils, the induced voltage of the respective coil decreases. As such, a comparison system that is electrically coupled to the pair of detection coils may be configured to detect a voltage difference between the respective coil and a reference voltage. Accordingly, when a voltage difference between the respective coil and the reference voltage exceeds a threshold, the comparison system may be configured to communicate the existence of the foreign object.

Figure 1:
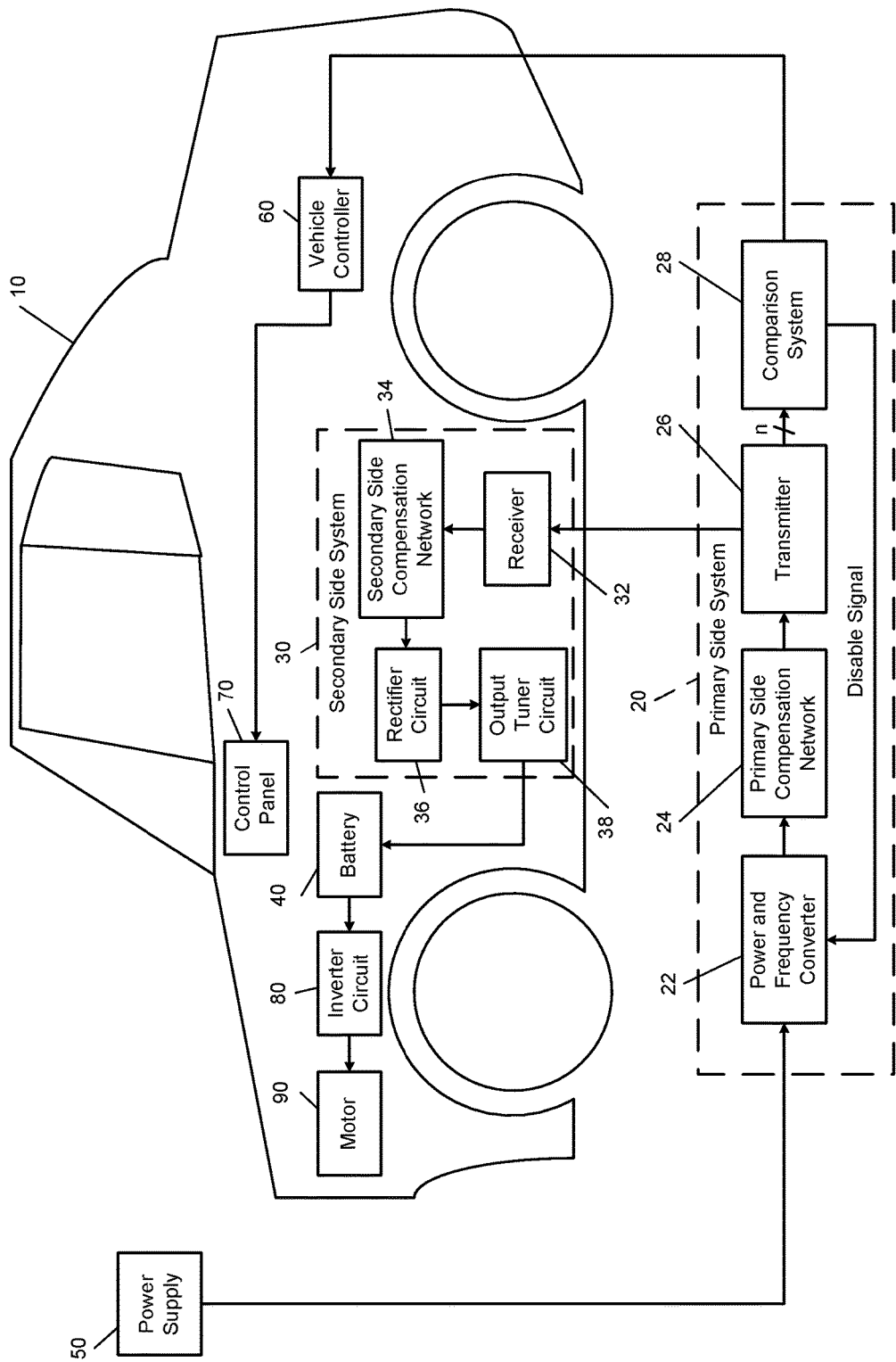
FIG. 1 is a high-level functional block diagram of a WPT system implemented in a vehicle.

FIG. 1 is a high-level functional block diagram of a WPT system implemented in a vehicle 10. In one embodiment, the WPT system includes a primary side system 20 that may include a power and frequency converter 22, a primary side compensation network 24, a transmitter 26, and a comparison system 28. The WPT system may also include a secondary side system 30 that includes a receiver 32, a secondary side compensation network 34, a rectifier circuit 36, and an output tuner circuit 38.

The primary side system 20 may be implemented in a garage at a home, and the secondary side system 30 may be mounted to the underside of the vehicle 10. Thus, when the vehicle 10 enters into the garage, a battery 40 of the vehicle 10 may begin to charge wirelessly. Alternatively, the primary side system 20 may be implemented at a charging station located at, for example, a gas station, a rest area, etc.

In one embodiment, the power and frequency converter 22 may convert an AC signal from a power supply 50 to an input AC signal at a desired resonant frequency. Accordingly, the power and frequency converter 22 may include a rectifier and an inverter. The rectifier may be configured to convert the AC signal from the power supply into a pulsating DC signal. As an example, the rectifier may include four switching components, such as a metal-oxide-semiconductor field-effect transistor (MOSFET), diode, or bipolar junction transistor (BJT), arranged in a bridge configuration. In other embodiments, the rectifier may include two switching components with a center-tapped transformer. The inverter, which is coupled to the rectifier, may then convert the pulsating DC signal into the input AC signal at the desired resonant frequency. The inverter may be, for example, a sine wave inverter or a modified sine wave inverter. To generate the input AC signal at the desired resonant frequency, a controller (not shown) may be electrically coupled to the inverter to control a switching speed of the MOSFETs or BJTs of the inverter.

Alternatively, the power and frequency converter 22 may convert the AC signal from the power supply 50 to the input AC signal at the desired resonant frequency using a frequency converter circuit. The frequency converter circuit may be configured to change the frequency (e.g., 60 Hz) of the AC signal from the power supply 50 to the desired resonant frequency while keeping the voltage from the power supply 50 unchanged. Example frequency converter circuits include a three-phase pulse-width modulation (PWM) AC-AC converter and a direct frequency converter with either a voltage source inverter (VSI) or a current source inverter (CSI).

In other embodiments, the power supply 50 may provide a DC signal. Accordingly, the power and frequency converter 22 may be include inverter as described above and omit a rectifier.

The power and frequency converter 22 may also be configured, as described in further detail below, to selectively connect and disconnect the power supply 50 from the WPT system in response to receiving a signal from the comparison system 28. Accordingly, the power and frequency converter 22 may be electrically coupled to the power supply 50 by a switch, such as a relay.

The primary side compensation network 24 may be implemented to improve power efficiency by mitigating leakage inductance of the primary side system 20. As an example, the primary side compensation network 24 may be an LC compensation network, an LCL compensation network, an LCC compensation network, etc.

The transmitter 26 is configured to wirelessly deliver power to the secondary side system 30 when the vehicle 10 is in place, the transmitter 26 is inductively coupled to the secondary side system 30. Additionally, the transmitter 26 may be configured to provide a plurality of coil voltages to the comparison system 28 for detection, measurement, and comparison. The transmitter 26 is described in further detail below with reference to FIGS. 2-5.

The comparison system 28 is configured to detect, measure, and compare induced voltages of a plurality of detection coils of the transmitter 26. As described below in further detail with reference to FIGS. 6-8, the comparison system 28 may be configured to detect a foreign object in the WPT system. As an example, if the comparison system 28 detects a foreign object in the WPT system, the comparison system 28 may be configured to turn off the WPT system, such as by providing a disable signal to the power and frequency converter 22. In response to the disable signal, the power and frequency converter 22 may be configured to disconnect the WPT system from the power supply 50.

In response to the comparison system 28 detecting a foreign object in the WPT system, the comparison system 28 may also be configured to communicate the presence of the foreign object to a vehicle controller 60. The vehicle controller 60 may then communicate the presence of the foreign object to an operator of the vehicle 10 by sending a signal corresponding to the presence of the foreign object to a control panel 70. In one embodiment, the control panel 70 may be a dashboard or a touch screen user interface in the vehicle 10. The control panel 70 may be configured to provide, in response to detecting a foreign object, a visual alert (e.g., a flashing icon on a dashboard and/or a touch-screen interface), an auditory alert (e.g., a beep or loud audio tone), and/or a haptic alert (e.g., using tapping vibration pulses on a steering wheel or a driver seat to alert the operator of the foreign object).

Additionally or alternatively, the vehicle controller 60 may communicate the presence of the foreign object to a mobile device using, for example, an LTE or other cellular data signal, Wi-Fi, or Bluetooth link. Thus, in response to the comparison system 28 detecting the presence of a foreign object, an operator of the mobile device may be alerted of the foreign object via an application of the mobile device.

The receiver 32 may be a coil that is inductively coupled to the transmitter 26, and it may be configured to deliver power to the battery 40 through the secondary side compensation network 34, the rectifier circuit 36, and the output tuner circuit 38 in response to receiving power from the transmitter 26.

The secondary side compensation network 34 may be implemented to improve power efficiency by mitigating leakage inductance of the secondary side system 30. As an example, the secondary side compensation network 34 may be an LC compensation network, LCL compensation network, LCC compensation network, etc.

The rectifier circuit 36 converts the AC signal of the receiver 32 to a DC signal. The rectifier circuit 36 may include four switching components, such as a MOSFET, diode, or BJT, arranged in a bridge configuration. In other embodiments, the rectifier circuit 36 may include two switching components with a center-tapped transformer.

The output tuner circuit 38, which may include a capacitor and an inductor coupled in series, may then reduce the ripple voltages and ripple currents of the DC signal from the rectifier circuit 36. The DC signal may then be delivered to the battery 40.

The battery 40 may output a DC signal to an inverter circuit 80 that converts the DC signal of the battery 40 into a motor input AC signal. The motor input AC signal drives a motor 90. In other embodiments, the vehicle 10 may include a DC motor and, therefore, the inverter circuit 80 may be removed. Accordingly, the DC signal from the battery 40 may be directly supplied to the DC motor. In addition to supplying power to the motor 90, the battery 40 may supply power to other components of the vehicle 10, such as an air conditioning compressor, a power steering pump, etc.

Figure 2:
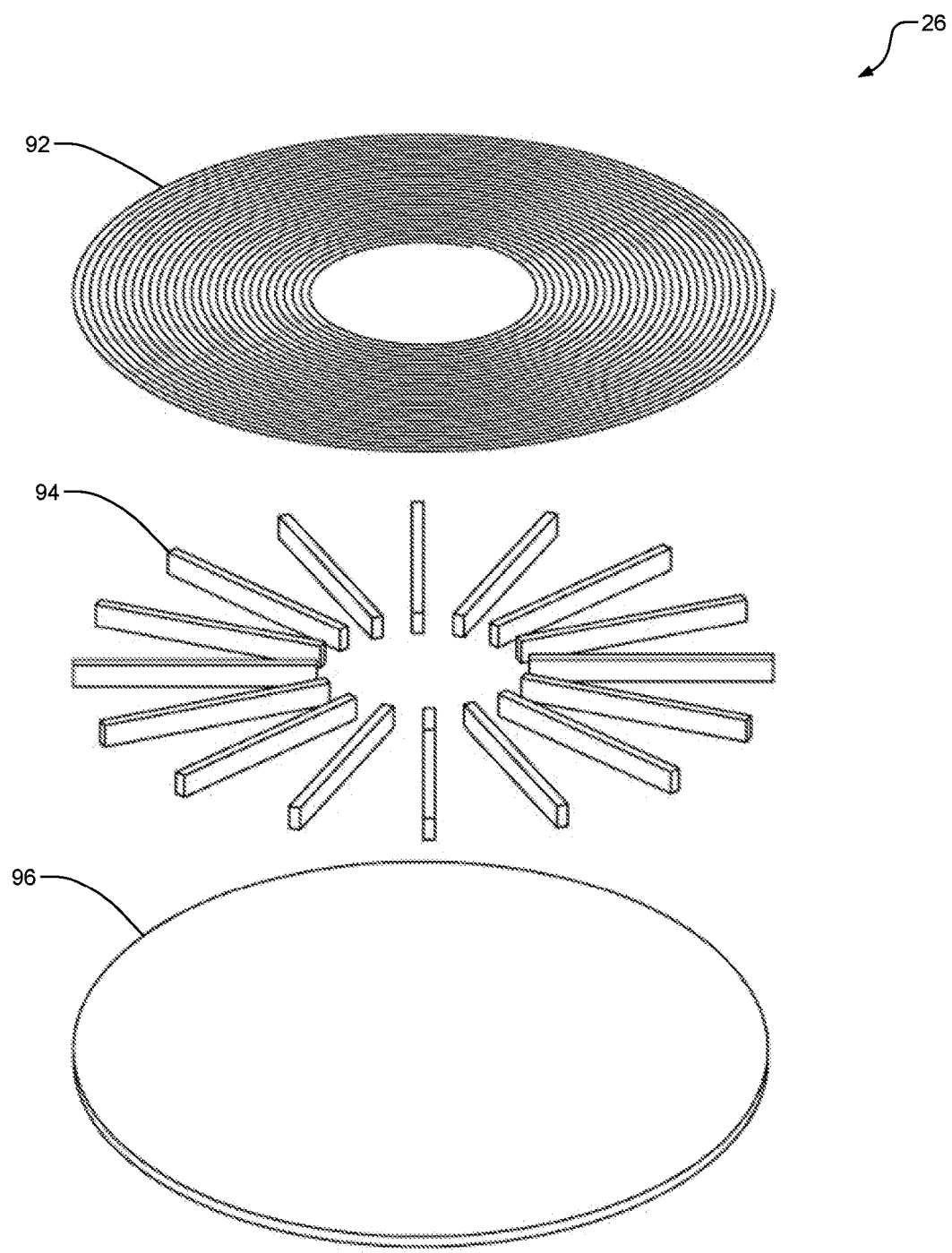
FIG. 2 is an exploded-view drawing of an example transmitter.

FIG. 2 is an exploded-view drawing of an implementation of the transmitter 26. The transmitter 26 may include a transmitting coil 92, a magnetic core 94, and a shield 96. The transmitting coil 92 may be a coil through which power from the power supply 50 is transmitted to the secondary side system 30. As an example, the transmitting coil 92 is made of copper or other materials having a high conductivity.

The transmitting coil 92 may be coupled to the magnetic core 94 so that magnetic flux generated by the voltage applied to the transmitting coil 92 is delivered to the secondary side system 30. As an example, the magnetic core 94 may be multiple ferrite bars, which exhibit low losses at high frequencies in WPT systems. Furthermore, a ferromagnetic material may be used since it generally has a high permeability, high temperature stability, and high saturation point. Other types of magnetic cores, such as solid metal and air cores, may be used in place of the ferrite bars. As an example, an air core, which generally does not saturate, may be used if the WPT system is operating at a resonant frequency that would cause a ferromagnetic core to saturate.

The shield 96 may be configured to electrically isolate the transmitter 26 from the remaining components within the WPT system and/or the vehicle 10. The shield 96 may be constructed from sheet metal, a metal screen, metal foam, copper, or other materials that prevent external magnetic fields from generating magnetic flux within the transmitter 26, thereby preventing external systems from affecting the magnetic field of the transmitting coil 92.

Additionally or alternatively, elements equivalent to the transmitting coil 92, the magnetic core 94, and the shield 96 described above may also be included in the receiver 32 (not shown).

Figure 3:
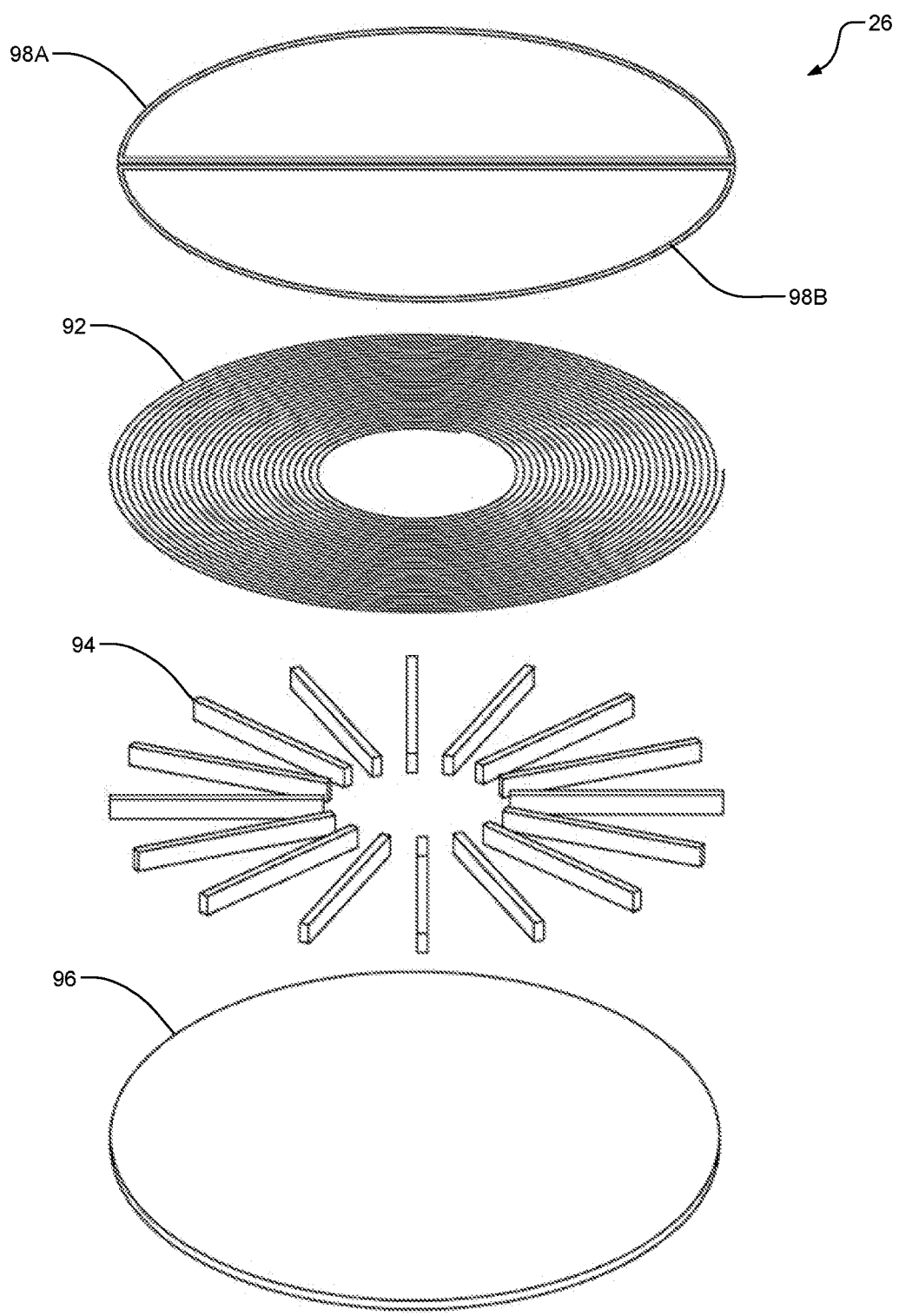
FIG. 3 is an exploded-view drawing of an example transmitter with a single pair of detection coils.

FIG. 3 is an exploded-view drawing of an implementation of the transmitter 26 that includes a pair of detection coils. The transmitter 26, as described above with reference to FIG. 2, includes the transmitting coil 92, the magnetic core 94, and the shield 96. The transmitter 26 also includes a pair of detection coils 98A-98B. The pair of detection coils 98A-98B, as described in further detail below, is configured to detect the presence of a foreign object in the WPT system. The pair of detection coils 98A-98B may be made of copper or other materials that have a high conductivity. The pair of detection coils 98A-98B may be inductively coupled to the transmitting coil 92 via an air core, thereby allowing magnetic flux generated in the transmitting coil 92 to flow into the pair of detection coils 98A-98B. Alternatively, a powdered or solid metal core may be used in place of the air core.

The pair of detection coils 98A-98B may each have a number of turns that is less than the number of turns of the transmitting coil 92. Accordingly, a 120 root-mean-square volt ($V_{RMS}$) supply from the power supply 50 may induce a lower voltage, such as $5V_{RMS}$, at each of the detection coils 98A-98B based on a number of turns of the transmitting coil 92 relative to the pair of detection coils 98A-98B.

Each coil of the pair of detection coils 98A-98B is configured to generate a voltage in response to the transmitter 26 receiving power from the power supply 50. In one embodiment, each coil of the pair of detection coils 98A-98B has equal coil area, thereby making the magnetic flux flowing from the transmitting coil 92 and into each coil of the pair of detection coils 98A-98B approximately equal in magnitude. As such, the induced voltages of each coil of the pair of detection coils 98A-98B are also equal in this embodiment. Alternatively, each coil of the pair of detection coils 98A-98B may have different coil areas, thereby making the induced voltage of each coil of the pair of detection coils 98A-98B unequal.

When a foreign object is not present in the WPT system, a reference voltage of each detection coil 98A-98B may be determined. On the other hand, when a foreign object is present within the WPT system, the induced voltages of one of the detection coils 98A-98B may no longer be equal to its corresponding reference voltage. The foreign object generates a magnetic field that opposes the magnetic field of the detection coil as a result of an eddy current generated in the foreign object. As such, the net magnetic field strength of the detection coil within which the foreign object is located decreases, thereby decreasing the induced voltage of the detection coil (e.g., if detection coil 98A has a reference voltage of 10V, the detection coil 98A may have an induced voltage of 8V when a foreign object is present within the area of the detection coil 98A).

As a result of a voltage difference between either detection coil voltage and a corresponding reference voltage, the comparison system 28 (not shown), which is electrically coupled to the pair of detection coils 98A-98B, may be configured to communicate the existence of a foreign object in response to determining that a voltage difference is present, as described below in further detail.

Figure 4:
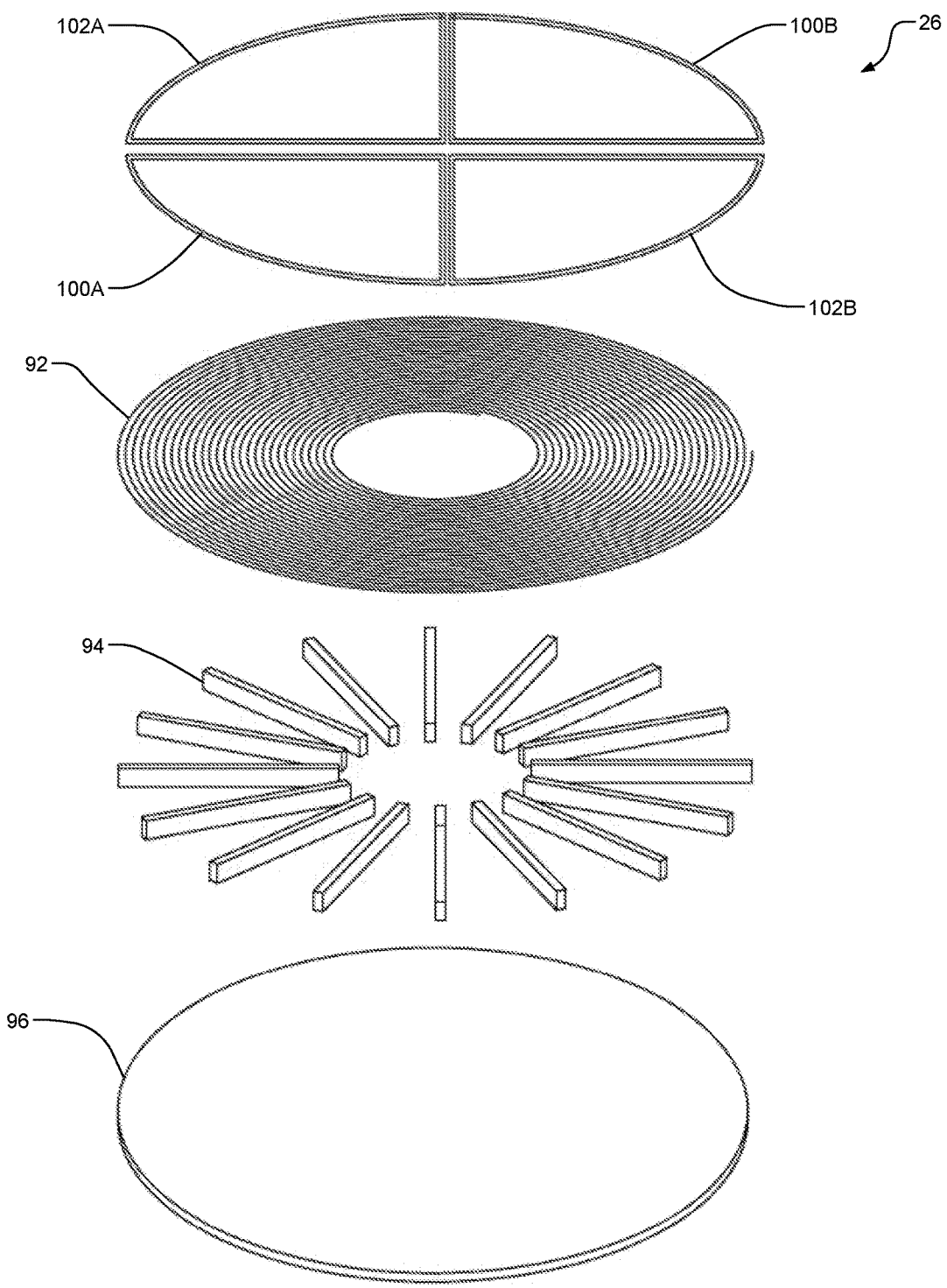
FIG. 4 is an exploded-view drawing of an example transmitter with two pairs of detection coils.

FIG. 4 is an exploded-view drawing of an implementation of the transmitter 26 with multiple pairs of detection coils. FIG. 4 includes two pairs of detection coils 100A-100B, 102A-102B. In this example embodiment, the detection coils 100A-100B, 102A-102B may be made of copper or other materials having a high conductivity. Additionally, the pair of detection coils 100A-100B, 102A-102B may each have a number of turns that is less than the number of turns of the transmitting coil 92. Thus, for example, a $120V_{RMS}$ supply from the power supply 50 may induce a lower voltage, such as 5V, at each of the detection coils 100A-100B, 102A-102B. Thus, the comparison system 28 may be able to generate reference voltages that are compared to the induced voltage of each coil of the pair of detection coils 100A-100B, 102A-102B.

Each coil of the pair of detection coils 100A-100B, 102A-102B is configured to generate a voltage in response to the transmitter 26 receiving power from the power supply 50. Furthermore, each coil of the respective pair of detection coils 100A-100B, 102A-102B has equal coil areas (i.e., the coil area of detection coil 100A is equal to the coil area of 100B, and the coil area of detection coil 102A is equal to the coil area of 102B). Thus, the magnetic flux flowing from the transmitting coil 92 and into each coil of a respective pair of the detection coils 100A-100B, 102A-102B is equal in magnitude (i.e., the magnetic flux flowing through coil 100A is equal to 100B, and the magnetic flux flowing through coil 102A is equal to 102B). As such, the induced voltages of each coil of the respective pair of detection coils 100A-100B, 102A-102B are also equal in this embodiment (i.e., the voltage of coil 100A is equal to coil 100B, and the voltage of coil 102A is equal to coil 102B). Alternatively, each coil of the respective pair of detection coils may have different coil areas, thereby making the induced voltage of each coil of the respective pairs of detection coils unequal in magnitude.

Figure 5:
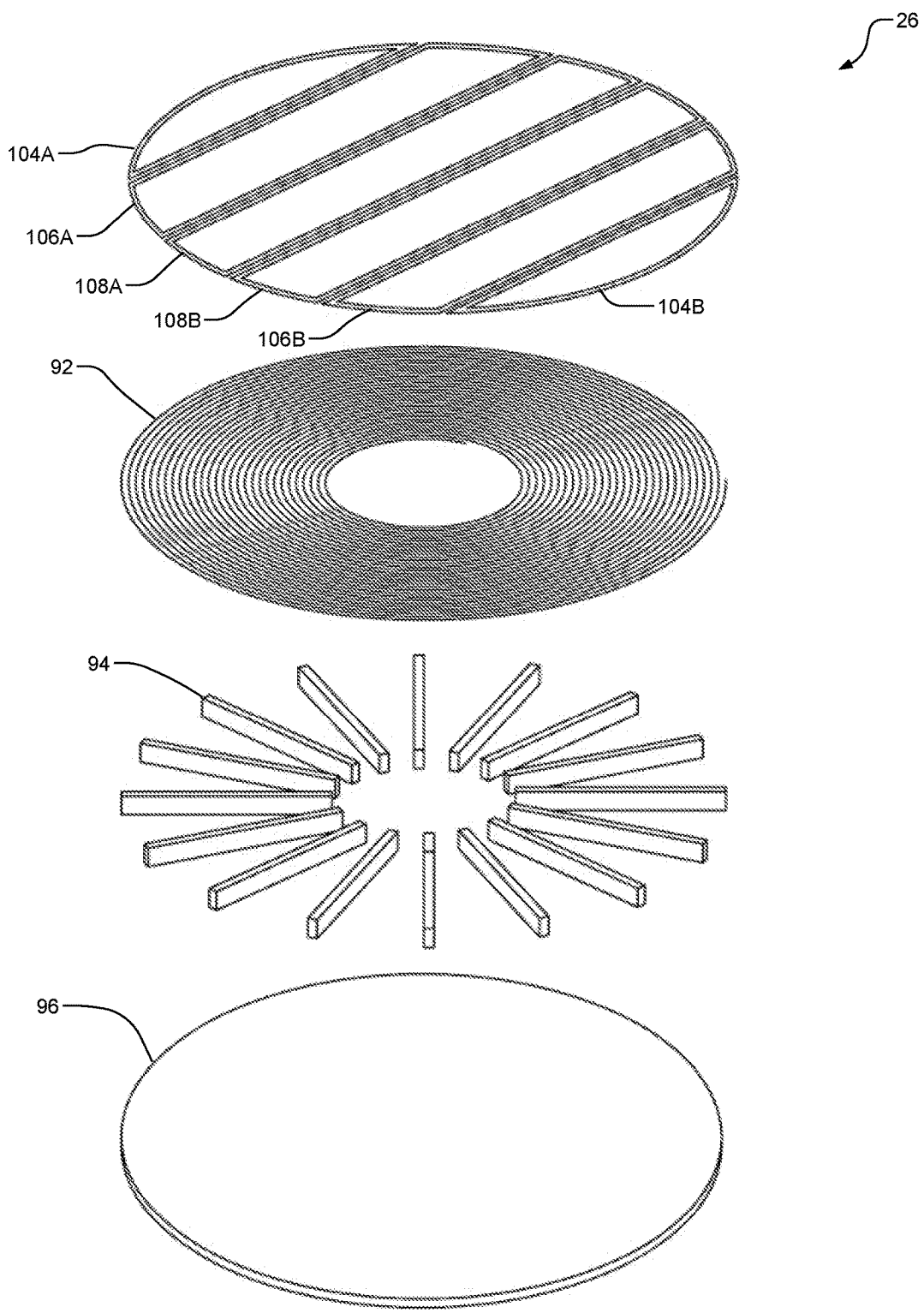
FIG. 5 is an exploded-view drawing of an example transmitter with three pairs of detection coils.

FIG. 5 is another exploded-view drawing of an implementation of the transmitter with multiple pairs of detection coils. FIG. 5 includes three pairs of detection coils 104A-104B, 106A-106B, 108A-108B. The detection coils 104A-104B, 106A-106B, 108A-108B may be constructed using copper or other materials that have a high conductivity. Furthermore, the pairs of detection coils 104A-104B, 106A-106B, 108A-108B function similarly to the embodiment described in FIG. 4, except that an extra pair of detection coils is included.

The number of pairs of detection coils described in FIGS. 3-5 is merely illustrative in nature. Generally, the number of pairs of detection coils used in the WPT system may be proportional to the accuracy of the foreign object detection system. As the coil area decreases, the magnetic field strength and induced voltage generated by the detection coil subsequently decreases; as such, the opposing magnetic field strength reduction and the voltage reduction in the respective coil caused by a foreign object may be more significant and detectable in a system that has more detection coil pairs having relatively smaller areas.

Figure 6:
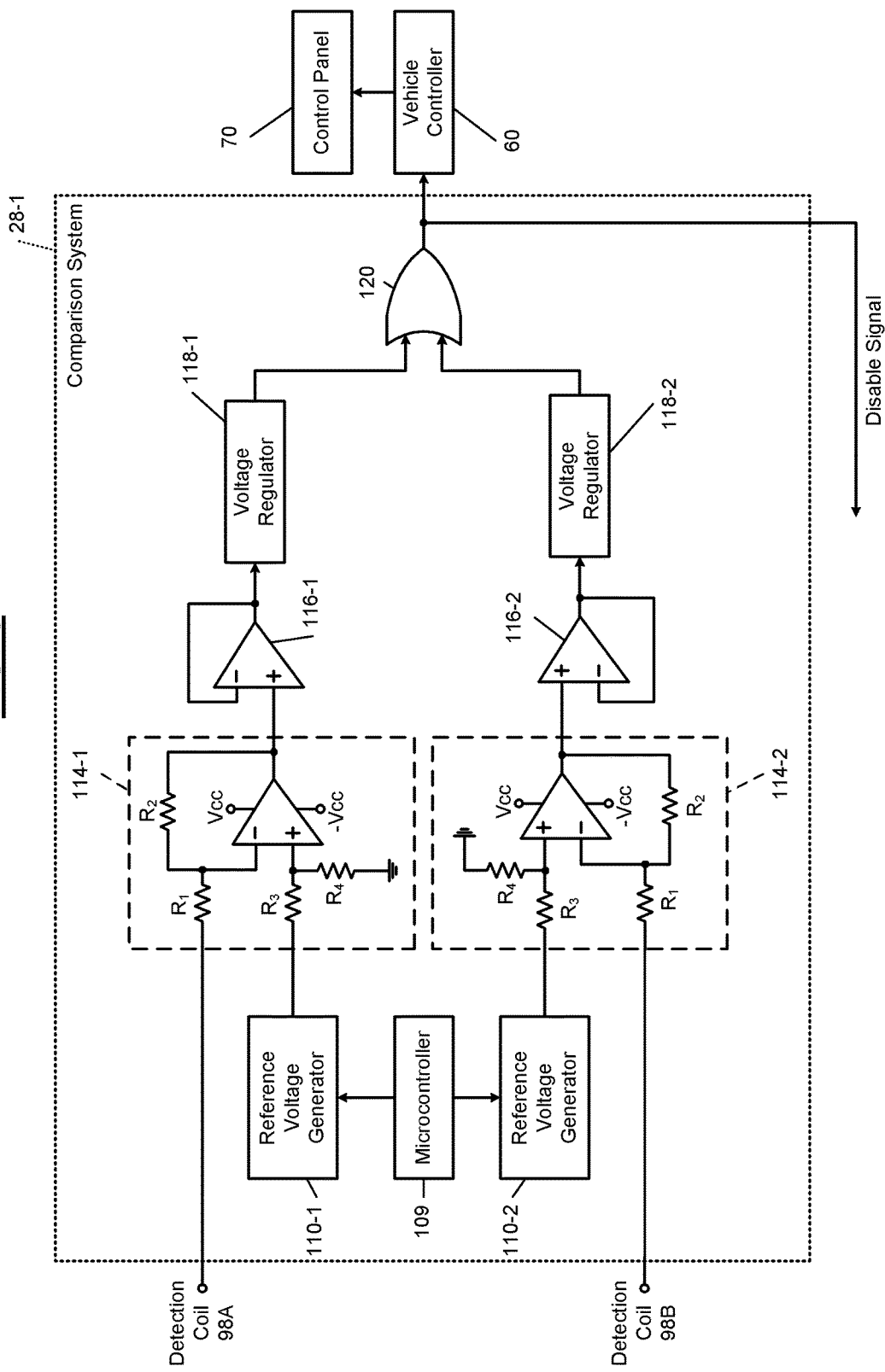
FIGS. 6-8 are example implementations of functional block diagrams of the comparison system.
Figure 7:
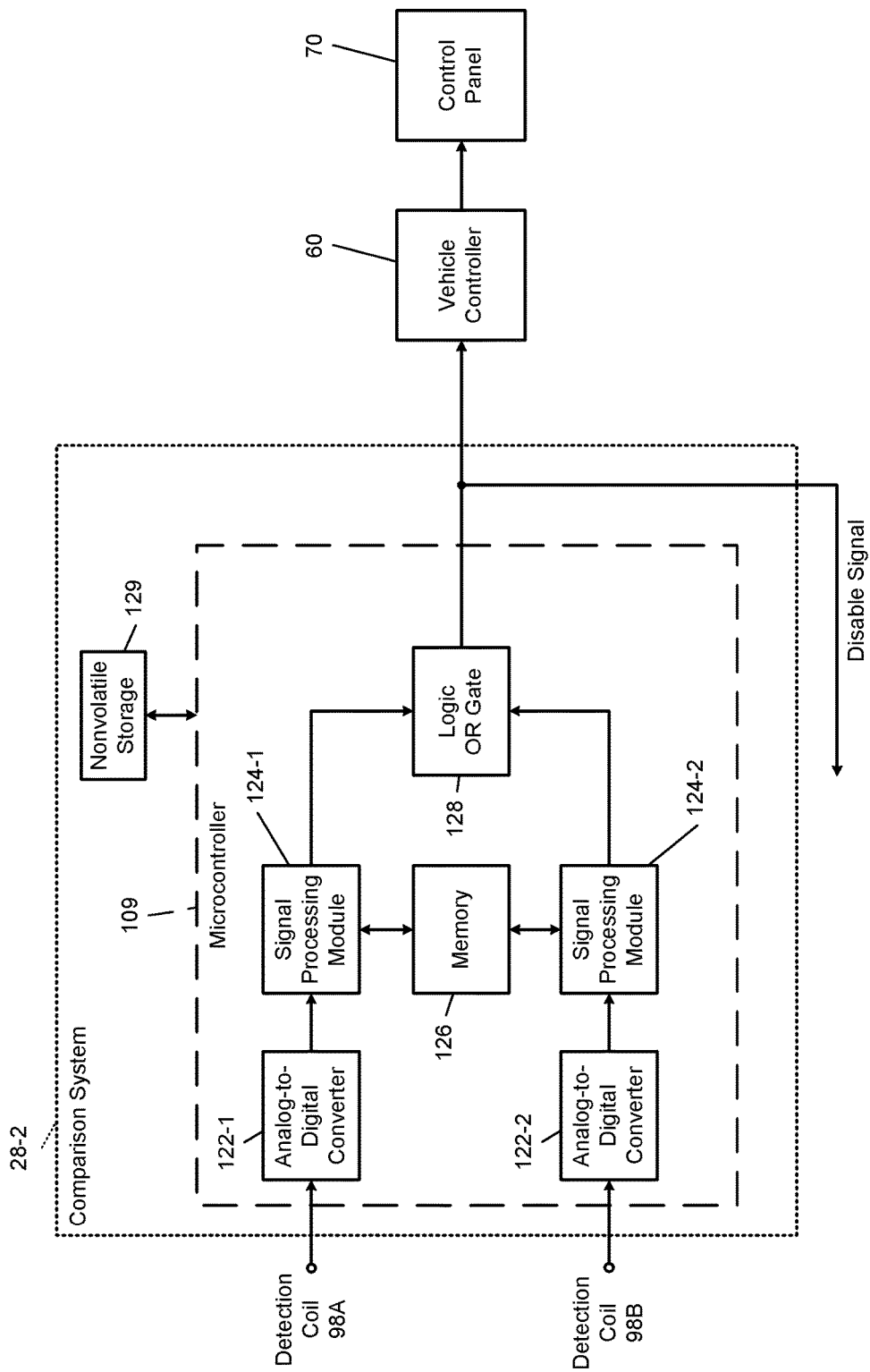
Figure 8:
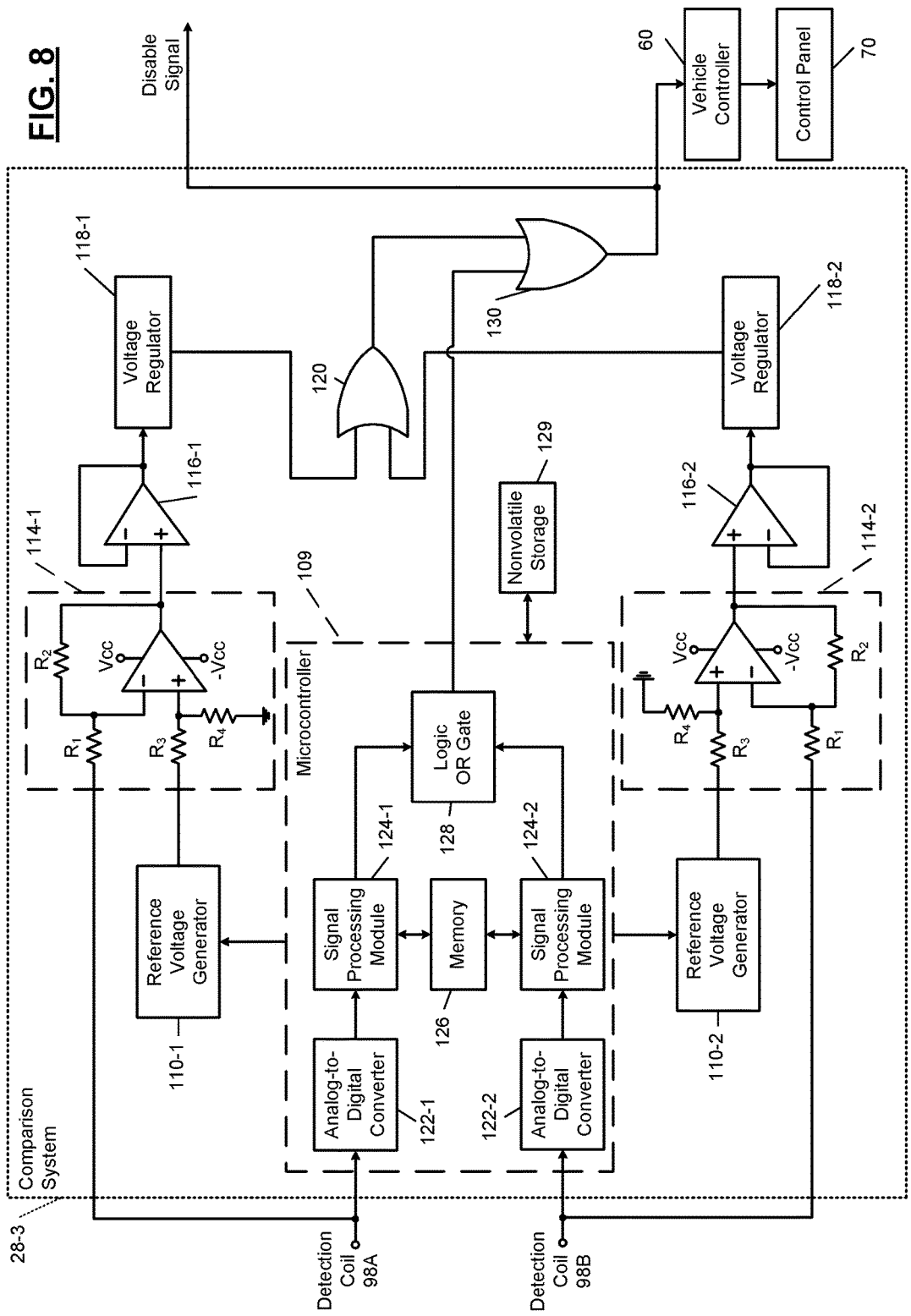

FIGS. 6-8 are example illustrations of the comparison system 28. As described above, the comparison system 28 may be configured to communicate the existence of a foreign object to the vehicle controller 60 and/or a mobile device in response to detecting a voltage difference between a detection coil and a corresponding reference voltage of the detection coil.

In an example embodiment shown in FIG. 6, a comparison system 28-1 includes a microcontroller 109, reference voltage generators 110-1, 110-2, differential operational amplifiers (op-amps) 114-1, 114-2, buffers 116-1, 116-2, voltage regulators 118-1, 118-2, and a logic gate 120.

If additional pairs of detection coils are implemented in the transmitter 26, then additional reference voltage generators 110, differential op-amps 114, buffers 116, and voltage regulators 118 may be implemented into the system. For example, each coil of a pair of detection coils may correspond to a respective reference voltage generator 110, differential op-amp 114, buffer 116, and voltage regulator 118.

The microcontroller 109, which may be electrically coupled to the reference voltage generators 110, may be configured to supply the reference voltage generators 110 with a DC signal in order to generate a reference voltage signal. The microcontroller 109 may also be configured to detect a phase difference between the detection coil signal and the reference voltage signal.

The microcontroller 109 may output the DC signal to the reference voltage generator 110-1 based on a reference voltage for the detection coil 98A. When a foreign object is located within the magnetic field of the detection coil 98A, the induced voltage will be less than the reference voltage due to a reduction in the net strength of the magnetic field. Thus, the reference voltage provides a maximum value with which the detection coil voltage is compared (i.e., the detection coil voltage being less than the reference voltage may indicate the presence of a foreign object within the area of the detection coil).

Each displacement of the receiver 32 relative to the transmitter 26 may induce a different reference voltage for each of the detection coils. As an example, if the receiver 32 is laterally displaced from the transmitter 26 by two feet, it may induce a smaller reference voltage than when the receiver 32 is directly aligned with the transmitter 26. Thus, different reference voltages may need to be determined for a variety of positions and/or coil misalignments (e.g., lateral displacement, vertical displacement, angular misalignment, etc.). Additionally, the reference voltage of the detection coils may be determined when the vehicle 10 is absent from the system.

Accordingly, in order to supply the DC signal to the reference voltage generator 110 based on the reference voltage of the detection coil, the microcontroller 109 may be configured to receive position data of the receiver 32 and identify the reference voltages of each detection coil stored in a table of the microcontroller 109 that corresponds to the position of the receiver 32, as described below in further detail with reference to FIG. 10. The microcontroller 109 then may be configured to supply the DC voltage based on the identified reference voltages. As an example, if the reference voltage of detection coil 98A is $3.7V_{RMS}$ based on the position of the receiver 32, the microcontroller 108 may supply a signal at 3.7V to the reference generator 110-1.

The signal supplied from the microcontroller 109 to the reference voltage generator 110 is converted into an AC signal so that the differential op-amp 114 may properly compare the reference voltage signal to the detection coil signal. As such, the reference voltage generators 110 may also include an inverter that is configured to convert the signal from the microcontroller 109 to an AC signal at a frequency of the detection coil signal (e.g., 60 Hz). The inverter may be, for example, a sine wave inverter or a modified sine wave inverter. To generate the input AC signal at the desired resonant frequency, the microcontroller 109 may be electrically coupled to the inverter to control a switching speed of the MOSFETs or BJTs of the inverter.

As an example, if the reference voltage of detection coil 98A is $3.7V_{RMS}$ based on the position of the receiver 32, the microcontroller 109 may supply a DC signal at 3.7V to the reference generator 110-1. Then, the reference voltage generator 110-1 may convert the DC signal into a $3.7V_{RMS}$, 60 Hz reference voltage signal.

Additionally, a phase detector (not shown) may be included in the comparison system 28 to match a phase angle of the reference voltage signal and the phase angle of the detection coil signal. The voltage generated in the phase detector may be provided to the microcontroller 109 in order to form a phase-locked loop circuit. As such, the reference voltage generators 110 may adjust the output of the reference voltage signal in order to match the phase angle of the detection coil voltage signal. Example phase detectors include a mixer-based detector, such as a Schottky diode-based double-balanced mixer.

The differential op-amps 114 may be configured to generate an output voltage based on a voltage difference between the detection coil signal and the reference voltage signal. The differential op-amps 114 may amplify the voltage difference between the detection coil signal and the reference voltage signal, and the magnitude of the amplification may be determined by resistance values of resistors $R_1$, $R_2$, $R_3$, and $R_4$. As an example, if the resistance value of resistor $R_1$ is equal to the resistance value of $R_3$, and the resistance value of resistor $R_2$ is equal to the resistance value of $R_4$, then the output voltage of the differential op-amp 114 is the voltage difference between the detection coil signal and the reference voltage signal multiplied by $R_2/R_1$. The resistance value ratio of $R_2$ and $R_1$ may be based on a variety of factors, including optimizing the detection of small voltage differences of the detection coil signal and the reference voltage signal and limiting the output voltage such that it is not clipped by a supply voltage of the differential op-amp 114 (i.e., $\pm V_{CC}$).

Alternatively, the voltage difference of the detection coil signal and the reference voltage signal may be determined as a raw voltage difference. As such, the differential op-amp 114 may be configured to be a unity gain op-amp, such as by setting all of the resistance values of the resistors $R_1$, $R_2$, $R_3$, and $R_4$ equal to each other. Accordingly, the output voltage of the differential op-amp 114 may be the voltage difference of the detection coil signal and the reference voltage signal.

Non-linear circuit elements, such as a diode, may be implemented at each of the outputs of the differential op-amps 114, thereby preventing the differential op-amps 114 from outputting a voltage when the voltage of the detection coil signal is greater than the reference voltage signal. Noise in the signal delivered to the input of the differential op-amps 114 may generate an output voltage when a foreign object does not exist within the magnetic field of the detection coil. Accordingly, the differential op-amps 114 may be configured to generate an output only when the voltage of the detection coil signal is less than voltage of the reference voltage signal (i.e., a foreign object is within one of the detection coils' magnetic field).

The buffers 116 couple the differential op-amps 114 to the voltage regulators 118. The buffers 116 may be configured to prevent the voltage regulators 118 from loading other elements of the comparison system 28-1. As an example, the buffers 116 may be voltage follower op-amps. An inverting input of the voltage follower op-amp may be coupled to the output of the voltage follower op-amp, and the output of the differential op-amp 114 may be coupled to the non-inverting input of the voltage follower op-amp. Accordingly, the voltage follower op-amp is configured to adjust its output voltage so that it is equal to the input voltage.

The voltage regulators 118, which couple the buffers 116 to the logic gate 120, may be configured to limit the amount of voltage applied to the logic gate 120. As an example, the voltage regulators may be configured to limit the amount of voltage applied to the logic gate 120 to an offset voltage. The offset voltage is defined as a threshold voltage difference between the detection coil signal and the reference voltage signal that indicates the presence of a foreign object in the WPT system. Additionally or alternatively, the voltage regulators 118 may be configured to limit the amount of voltage applied to the logic gate to a value that is between a minimum voltage necessary to drive the logic gate 120 and the rated voltage of the logic gate 120.

The logic gate 120, which may be an OR gate, is configured to output a signal to the vehicle controller 60 in response to at least one of the voltage regulators 118 outputting the offset voltage. The logic gate 120 may be a transistor-transistor-logic (TTL) circuit or a complementary metal-oxide semiconductor (CMOS) integrated circuit. More than one logic gate 120 may be included in the comparison system 28-1 if the number of inputs of the logic gate 120 is less than the number of detection coils in the system. As an example, if three pairs of detection coils are implemented in the transmitter 26, and the logic gate 120 has four inputs, then a second logic gate 120 may be needed for the third pair of detection coils.

Furthermore, the logic gate 120 may also be configured to output the signal to the power and frequency converter 22, as described above. The signal provided to the power and frequency converter 22, which is shown as the disable signal, may be configured to deactivate the WPT system in response to one of the inputs receiving the offset voltage.

The vehicle controller 60, in response to having received the signal from the logic gate 120, may be configured to communicate the presence of a foreign object in the WPT system to the control panel 70. Additionally or alternatively, a mobile device (not shown), may be in communication with the vehicle controller 60 via an LTE or other cellular data signal, Wi-Fi, or Bluetooth. The vehicle controller 60 may communicate the presence of a foreign object in the WPT system to an operator of the mobile device.

FIG. 7 is another example embodiment of a comparison system 28-2. The comparison system 28-2 includes the microcontroller 109, which further includes a plurality of analog-to-digital converters (ADCs) 122-1, 122-2, a plurality of signal processing modules 124-1, 124-2, a memory 126, a logic OR gate 128, and a nonvolatile storage 129.

While this embodiment illustrates two ADCs 122-1, 122-2 and two signal processing modules 124-1, 124-2 being used for a pair of detection coils 98A-98B, additional ADCs 122 and signal processing modules 124 may be included in the comparison system 28-2 when multiple pairs of detection coils are used. As an example, if there are five pairs of detection coils, ten ADCs 122 and ten signal processing modules 124 may be implemented into the comparison system 28-2 to determine whether a foreign object is within the magnetic field of the detection coils 98A-98B.

The ADCs 122 are configured to convert the detection coil signal, which is an analog signal, into a digital signal. As an example, the ADCs 122 may be configured to sample the detection coil signal at a sampling rate that is greater than or equal to a Nyquist rate, which is defined as twice the frequency of the detection coil signal. As an example, if the frequency of the detection coil signal is 60 Hz, the sampling rate of the ADCs 122 may be greater than or equal to the Nyquist rate, which is 120 Hz. As such, the ADCs 122 will determine at least 120 discrete voltage values per second of the detection coil signal.

The ADCs 122 may be flash ADCs, successive-approximation ADCs, ramp-compare ADCs, sigma-delta ADCs, etc. Furthermore, while the ADCs 122 are shown as part of the microcontroller 109, in other embodiments, the ADCs may not be part of the microcontroller 109 and are electrically coupled to the microcontroller 109 by, for example, a twisted-pair cable.

The signal processing modules 124, which may be implemented by a processor of the microcontroller 109, are configured to compare the digital signals from the ADCs 122 to the reference voltages of the respective detection coil based on instructions stored in at least one of the nonvolatile storage 129 and the memory 126.

In one embodiment, when the microcontroller 109 receives a signal indicating the position of the receiver 32, as described below in further detail, the signal processing modules 124 may be configured to identify corresponding reference voltage data associated with the position stored in at least one of the memory 126 and the nonvolatile storage 129. Additionally, the reference voltage data associated with the position may include a reference voltage value in addition to the position. As an example, when the microcontroller 109 receives the signal indicating the position of the receiver 32 is laterally displaced from the transmitter 26 by two inches, the signal processing modules 124 are configured to identify the reference voltage value of the reference voltage data corresponding to the two inch lateral displacement. The two inch displacement may correspond to, for example, a reference voltage value of $2.5V_{RMS}$ of detection coil 98A and $1.25V_{RMS}$ of detection coil 98B.

Additionally, the reference voltage value may be stored as a digital reference value, thereby allowing the signal processing modules 124 to perform a comparison of the digital value of the ADCs 122 to the reference voltage values. As an example, the reference voltage value of detection coil 98A ($2.5V_{RMS}$) may be stored in the memory 126 as a digital reference value of "01111111", and the reference voltage value of detection coil 98B ($1.25V_{RMS}$) may be stored in the memory 126 as a digital reference value of "00111111".

Accordingly, the signal processing modules 124 may be configured to, using instructions stored in the memory 126 or the nonvolatile storage 129 that are executable by the processor, compare the identified digital reference value to the digital signal. If the signal processing module detects that a difference of the digital signal and the digital reference value is greater than a digital value corresponding to the offset voltage, then the signal processing modules 124 may be configured to provide a signal to the logic OR gate 128. In this embodiment, the offset voltage may be set at a value in which quantization intervals and/or noise alone cannot indicate the presence of a foreign object in the WPT system. As such, the offset voltage may be based on a percentage difference or a raw difference between the digital reference value and the digital signal. As an example, the offset voltage may be a 5% difference between the digital signal and the digital reference value.

In response to receiving at least one signal from the signal processing modules 124, the logic OR gate 128 may be configured to output a signal to the vehicle controller 60. The signal indicates that a foreign object is located in the WPT system. Additionally, the logic OR gate 128 may also be configured to output the signal to the power and frequency converter 22, as described above. The signal provided to the power and frequency converter 22, which is shown as the disable signal, may be configured to deactivate the WPT system.

The vehicle controller 60, in response to having received the signal from the logic gate 120, may be configured to communicate the presence of a foreign object in the WPT system to the control panel 70. Additionally or alternatively, a mobile device (not shown), which may be in communication with the vehicle controller 60, may be configured to receive an LTE or other cellular data signal, Wi-Fi, or Bluetooth Link signal from the vehicle controller 60 and communicate the presence of a foreign object in the WPT system to an operator of the mobile device.

FIG. 8 is another example embodiment of a comparison system 28-3. This embodiment combines features of both FIG. 6 and FIG. 7, thus incorporating both digital and analog signal processing. As an example, the analog signal processing embodiment described in FIG. 7 may not detect a small voltage difference between the reference voltage signal and the detection coil signal due to the presence of a small foreign object in the WPT system. However, the signal processing modules 124, as a result of a large quantization range, may be able to detect the presence of a small foreign object in the WPT system (e.g., the analog values are quantized from 0-255, thereby allowing the signal processing modules 124 to detect small differences between a coil voltage and a respective reference voltage). Thus, the implementation of both digital and analog signal processing may improve the accuracy and reliability of the foreign object detection system.

In order to communicate the presence of a foreign object in the WPT system when at least one of the analog and digital signal processing systems detects a foreign object, an additional logic gate 130 may be electrically coupled to the output of logic gate 120 of the analog signal processing system and the logic OR gate 128 of the digital signal processing system. In response to receiving a signal from at least one of the logic gate 120 and the logic OR gate 128, the logic gate 130 may be configured to output a signal to the vehicle controller 60. The signal indicates that a foreign object is located in the WPT system.

Additionally, the logic gate 130 may also be configured to output the signal to the power and frequency converter 22, as described above. The signal provided to the power and frequency converter 22, which is shown as the disable signal, may be configured to deactivate the WPT system.

The vehicle controller 60, in response to having received the signal from the logic gate 130, may be configured to communicate the presence of a foreign object in the WPT system to the control panel 70. Additionally or alternatively, a mobile device (not shown), which may be in communication with the vehicle controller 60, may be configured to receive an LTE or other cellular data signal, Wi-Fi, or Bluetooth Link signal from the vehicle controller 60 and communicate the presence of a foreign object in the WPT system to an operator of the mobile device.

Figure 9:
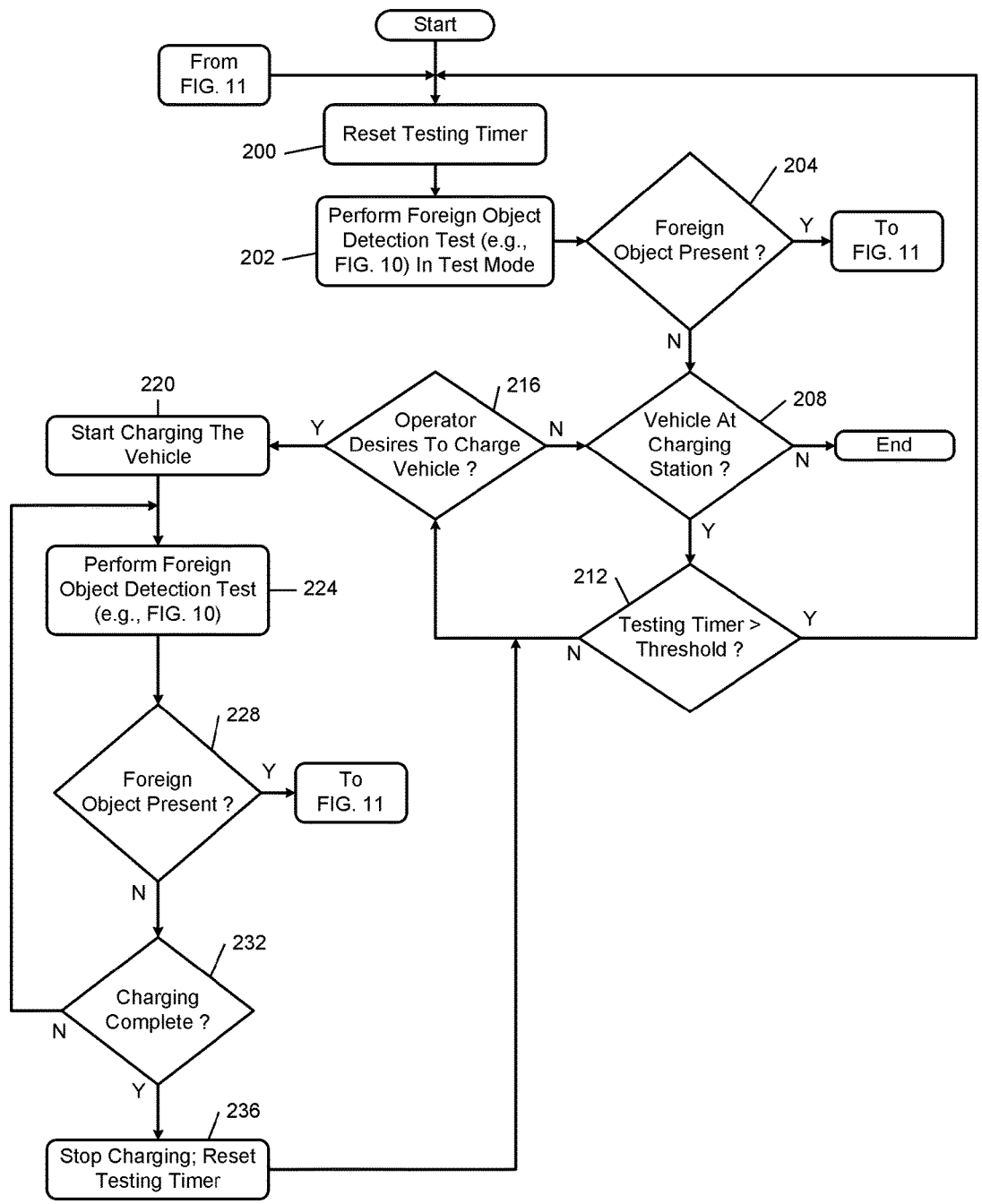
FIG. 9 is a flowchart describing example operation of the foreign object detection system and the WPT system.

FIG. 9 is a flowchart describing example operation of the foreign object detection system and the WPT system. While the WPT system may operate when the vehicle is located in the charging area and the operator desires to charge the vehicle, the foreign object detection system may be configured to operate even when the vehicle is not in the charging area. Control may begin at 200, where control resets the testing timer.

At 202, control performs the foreign object detection test in the test mode. The test mode may be defined as performing the foreign object detection test at a lower power relative to the foreign object detection test being performed when the vehicle is charging. As an example, the test mode may be configured to perform the foreign object detection test at half of the input voltage (e.g., $60V_{RMS}$). As another example, the test mode may be configured to perform the foreign object detection test at one tenth of the input voltage (e.g., $12V_{RMS}$). As such, the foreign object detection test in the test mode may conserve energy and reduce the stress on the components of the foreign object detection and the WPT system.

At 204, control determines whether a foreign object is present in the WPT system. If so, control transfers to FIG. 11, which is a flowchart describing example operation of the foreign object detection system when a foreign object is detected in the WPT system. Otherwise, control transfers to 208. At 208, control determines whether the vehicle is at the charging station. If so, control transfers to 212; otherwise, control ends.

At 212, control determines whether the testing timer is greater than a threshold testing timer value. The threshold testing timer value may be defined as a value that triggers the performance of the foreign object test in the test mode. As an example, the foreign object detection test may be performed less frequently while in the test mode than while charging. The threshold testing timer value may be two hours, four hours, six hours, etc. If the testing timer is not greater than the threshold testing timer value, control transfers to 216; otherwise, control returns to 200. At 216, control determines whether the operator desires to charge the vehicle. If so, control transfers to 220; otherwise, control returns to 208.

At 220, the WPT system starts charging the vehicle. At 224, control performs the foreign object detection test. An example operation of the foreign object detection test is described in FIG. 10. The foreign object detection test may be performed simultaneously with the charging of the vehicle. At 228, control determines whether a foreign object is present within the WPT system. If so, control transfers to FIG. 11; otherwise, control transfers to 232. At 232, control determines whether the vehicle is charged. If so, control transfers to 236; otherwise, control returns to 224. At 236, control stops charging the vehicle and resets the testing timer. Control then returns to 216.

Figure 10:
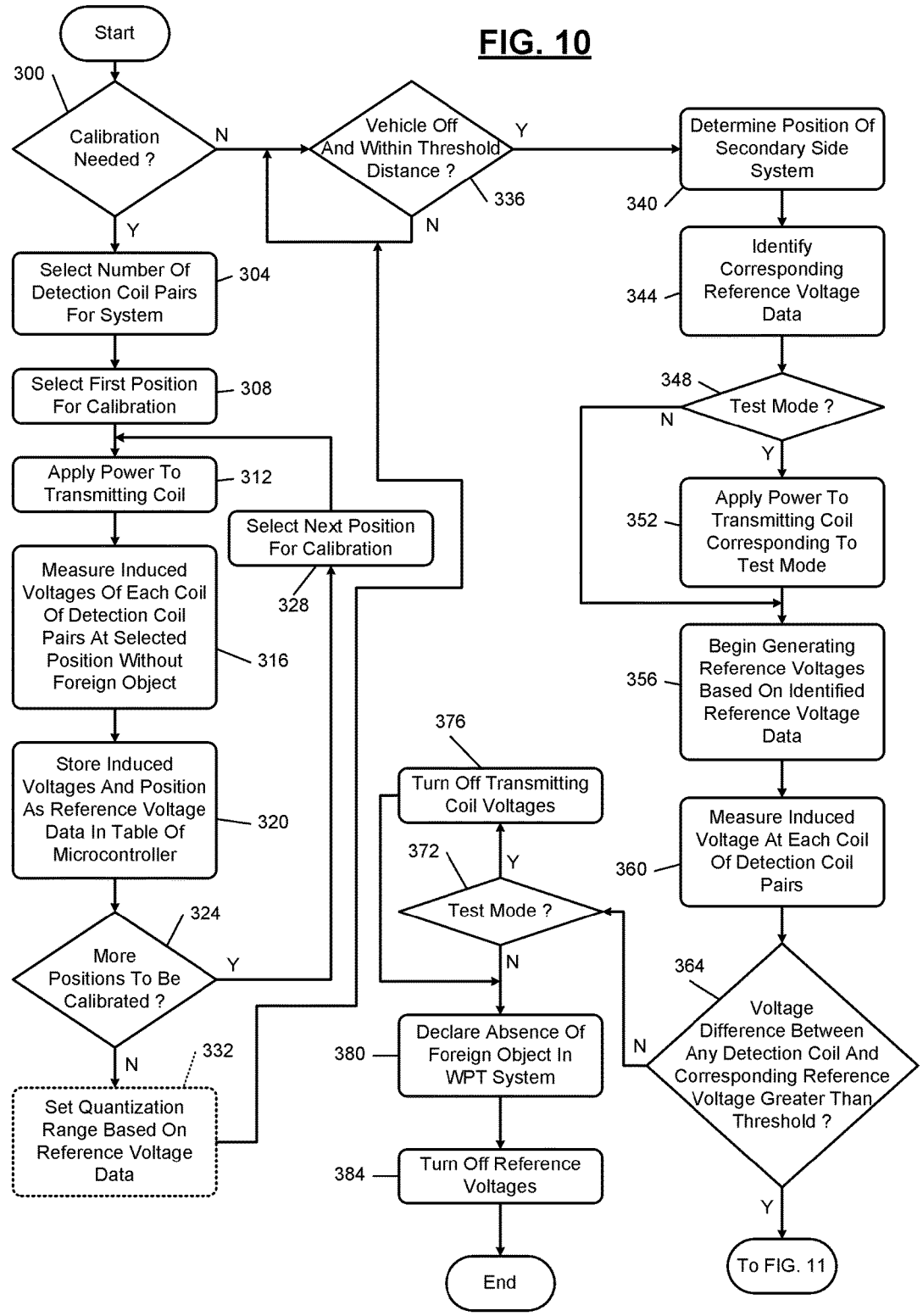
FIG. 10 is a flowchart describing example operation of the foreign object detection system.

FIG. 10 is a flowchart describing example operation of the foreign object detection test. Control starts at 300 by determining whether a calibration of the foreign object detection system is needed. If so, control transfers to 304; otherwise, control transfers to 336. At 304, control selects the number of detection coil pairs for the system. At 308, control determines the first position of the secondary side system for calibration. As an example, the first position of the secondary side system may be chosen such that the receiving coil and the transmitting coil are at least one of angularly misaligned, laterally misaligned, and vertically displaced. At 312, control applies power to the transmitting coil. At 316, the comparison system measures the induced voltage of each coil of the detection coil pairs without a foreign object, and the comparison system stores the induced voltages corresponding to the selected position as reference voltage data in a table of the microcontroller at 320. As an example, the reference voltage data of each coil of the detection coil pairs may also include data describing the angular misalignment, lateral misalignment, vertical displacement, and an input voltage.

At 324, control determines whether there are additional positions of the secondary side system that need to be calibrated. If so, control transfers to 328; otherwise, control transfers to 332. At 328, control selects the next position of the secondary side system to be calibrated and then returns to 312.

At 332, which is performed if the comparison system incorporates digital signal processing as described in FIGS. 7-8, control sets the quantization range based on the reference voltage data as a result of the incorporation of digital signal processing. As an example, if the induced voltage value of the reference voltage data range from 0-5$V_{RMS}$, the quantization range for analog to digital conversion may be set from 0-255.

Returning to 336, control determines whether the vehicle is off and within the threshold distance. If so, control transfers to 340; otherwise, control remains at 336 until the vehicle is off and within the threshold distance. The threshold distance may be, for example, a predetermined lateral misalignment. At 340, control determines the position of the secondary side system. Specifically, the lateral and angular misalignment and the vertical displacement between the transmitting coil and the receiving coil are determined. To determine vertical displacement and lateral and angular misalignment, for example, a plurality of distance/object detection sensors, such as an infrared sensor, may be implemented to determine the vertical displacement between the transmitting coil and the receiving coil and to communicate the vertical displacement to the microcontroller.

At 344, the microcontroller identifies the corresponding reference voltage system based on the determined position of the secondary side system. At 348, control determines whether the foreign object detection system is operating in the test mode, as described in FIG. 9. If so, control transfers to 352; otherwise, control transfers to 356. At 352, control applies power to the transmitting coil corresponding to the test mode. As an example, control may apply power to the transmitting coil at half of the input voltage (e.g., 60$V_{RMS}$). Control then transfers to 356.

At 356, control begins generating the reference voltages based on the identified reference voltage data. At 360, control measures the induced voltage at each coil of the detection coil pairs. At 364, control determines whether the voltage difference between any detection coil and corresponding reference voltage is greater than a threshold voltage. As an example, the threshold voltage may be the offset voltage, as described above. If the voltage difference is greater than the threshold voltage, control transfers to FIG. 11; otherwise, control transfers to 372.

At 372, control determines whether the foreign object detection test is being performed in the test mode. If so, control transfers to 376; otherwise, control transfers to 380. At 376, control turns off the transmitting coil voltages and transfers to 380. At 380, control declares the absence of a foreign object in the WPT system and transfers to 384. At 384, control turns off the reference voltages and then ends.

Figure 11:
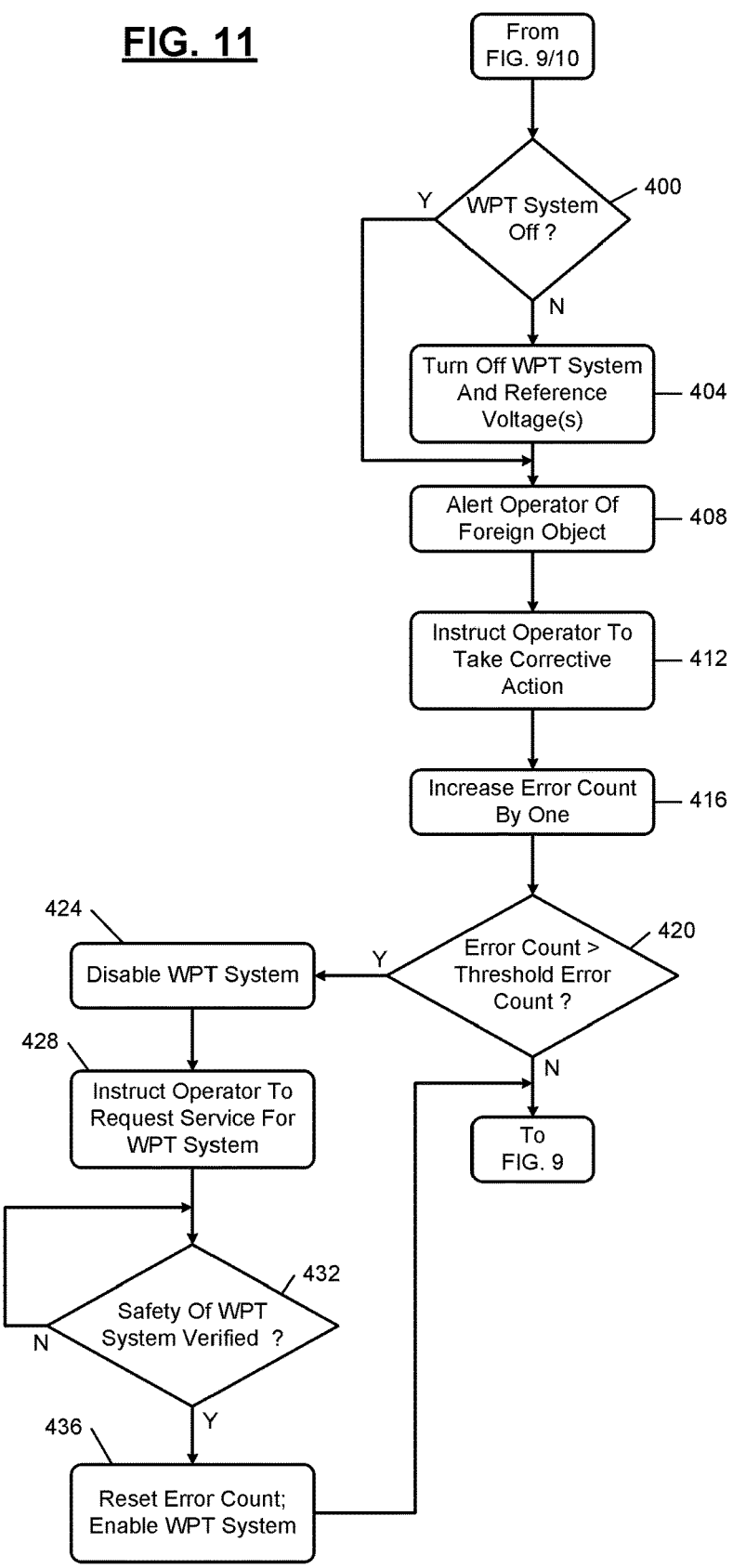
FIG. 11 is a flowchart describing example operation of the foreign object detection system when a foreign object is detected in the WPT system.

FIG. 11 is a flowchart describing example operation of the foreign object detection system when a foreign object is detected in the WPT system. As an example, control may begin when the foreign object detection system detects a foreign object in the WPT system, as described in FIGS. 9 and 10. At 400, control determines whether the WPT system is off. If the WPT system is on, control transfers to 404; otherwise, if the WPT system is off, control transfers to 408. At 404, control turns off the WPT system and the reference voltages and then transfers to 408.

At 408, control alerts the operator of the presence of a foreign object using, for example, the control panel of the vehicle. Using the control panel, an auditory alert, such as an alarm, may be triggered at step 408 to alert the operator of the presence of a foreign object. Additionally or alternatively, the alert may be communicated to a mobile device in communication with the vehicle controller. At 412, control instructs the operator to take corrective action. The control panel may be configured to identify and communicate to the operator the coil area in which the foreign object resides. As an example, the control panel or the mobile device may display a message on a screen that states: "Please Remove Foreign Object from Charging System."

At 416, control increases an error count of the WPT system by one. The error count may be defined as a number of instances in which the comparison system detects a foreign object in the WPT system. As an example, the error count may rise by one each time a foreign object is detected in the system. Additionally or alternatively, the error count may be configured to decrease or reset based on a certain condition. As an example, the error count may be configured to decrease by a predetermined amount after a predefined period has elapsed (e.g., the error count decreases by one after a week has elapsed). As another example, the error count may completely reset if no foreign object is detected over a period of thirty days.

At 420, control determines whether the error count is greater than a threshold error count. The threshold error count is an error count that may indicate a serious defect with the WPT system. As an example, the threshold error count may be a raw count (e.g., the threshold error count=ten). Alternatively, the threshold error count may be based on a raw number and a period of time (e.g., the threshold error count occurs when ten errors occur in a period of seven days). If the error count is greater than the threshold error count, control transfers to 424; otherwise, control returns to FIG. 9.

At 424, control disables the WPT system. At 428, control instructs the operator to request service for the WPT system. At 432, control determines whether the safety of the WPT system has been verified. Control may require the verification to be performed by, for example, the manufacturer or a serviceman. If so, control transfers to 436; otherwise, control remains at 432 and the WPT system remains disabled until the safety of the WPT system is verified. At 436, control enables the WPT system, resets the error count, and then returns to FIG. 9.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A wireless power transfer system comprising:
   a transmitter that includes a transmitting coil, a first detection coil, and a second detection coil, wherein:
   the transmitting coil is configured to receive and wirelessly radiate power from a power supply to a receiver of a vehicle;
   the first detection coil is configured to generate a first voltage in response to the radiated power from the transmitting coil; and the second detection coil is configured to generate a second voltage in response to the radiated power from the transmitting coil; and a comparison system electrically coupled to the transmitter, wherein the comparison system includes a microcontroller configured to, by instructions stored in non-transitory memory:

calculate a difference between the first voltage and a first reference voltage;

calculate a difference between the second voltage and a second reference voltage;

generate a first logic signal in response to the difference between the first voltage and the first reference voltage exceeding a threshold value; and generate a second logic signal in response to the difference between the second voltage and the second reference voltage exceeding the threshold value;

wherein the comparison system includes (i) a first differential operational amplifier configured to output a first signal based on the difference between the first voltage and the first reference voltage and (ii) a second differential operational amplifier configured to output a second signal based on the difference between the second voltage and the second reference voltage;

wherein the comparison system is configured to declare presence of a foreign object in proximity to the transmitter in response to one of (i) the first logic signal being generated, (ii) the second logic signal being generated, (iii) the first signal being outputted, and (iv) the second signal being outputted; and wherein the transmitter is selectively disabled in response to presence of the foreign object being declared.

2. The wireless power transfer system of claim 1 wherein the comparison system includes:

a voltage regulator configured to generate a limited signal by limiting a voltage of the first signal from the first differential operational amplifier; and a logic gate configured to receive the limited signal.

3. The wireless power transfer system of claim 2 wherein the comparison system includes:

a second voltage regulator configured to generate a second limited signal by limiting a voltage of the second signal from the second differential operational amplifier, wherein the logic gate is configured to receive the second limited signal and generate an output based on the limited signal and the second limited signal.

4. The wireless power transfer system of claim 2 wherein the comparison system includes a unity-gain amplifier electrically connected in series between the first differential operational amplifier and the voltage regulator.

5. The wireless power transfer system of claim 1 wherein the comparison system includes a reference voltage generator configured to generate the first reference voltage.

6. The wireless power transfer system of claim 1 wherein the comparison system is configured to, in response to presence of the foreign object being declared, at least one of (i) sound an audible alarm, (ii) actuate a visual alarm, and (iii) transmit an alert to an operator of the vehicle.

7. A wireless power transfer method comprising:

receiving and wirelessly radiating power, with a transmitting coil of a transmitter, from a power supply to a receiver of a vehicle;

generating, with a first detection coil of the transmitter, a first voltage in response to the radiated power from the transmitting coil;

generating, with a second detection coil of the transmitter, a second voltage in response to the radiated power from the transmitting coil;

calculating, using a microcontroller of a comparison system electrically coupled to the transmitter, a difference between the first voltage and a first reference voltage, wherein the microcontroller is configured to execute instructions stored in non-transitory memory;

calculating, using the microcontroller, a difference between the second voltage and a second reference voltage, the comparison system including (i) a first differential operational amplifier configured to output a first signal based on the difference between the first voltage and the first reference voltage and (ii) a second differential operational amplifier configured to output a second signal based on the difference between the second voltage and the second reference voltage;

generating, using the microcontroller, a first logic signal in response to the difference between the first voltage and the first reference voltage exceeding a threshold value; and generating, using the microcontroller, a second logic signal in response to the difference between the second voltage and the second reference voltage exceeding the threshold value;

declaring, with the comparison system, presence of a foreign object in proximity to the transmitter in response to one of (i) the first logic signal being generated, (ii) the second logic signal being generated, (iii) the first signal being outputted, and (iv) the second signal being outputted; and disabling the transmitter in response to presence of the foreign object being declared.

8. The method of claim 7 further comprising:

generating, with a voltage regulator of the comparison system, a limited signal by limiting a voltage of the first signal from the first differential operational amplifier; and receiving, with a logic gate of the comparison system, the limited signal.

9. The method of claim 8 further comprising:

generating, with a second voltage regulator of the comparison system, a second limited signal by limiting a voltage of the second signal from the second differential operational amplifier;

receiving, with the logic gate, the second limited signal; and generating, with the logic gate, an output based on the limited signal and the second limited signal.

10. The method of claim 8 wherein the comparison system includes a unity-gain amplifier electrically connected in series between the first differential operational amplifier and the voltage regulator.

11. The method of claim 7 further comprising:

generating, with a reference voltage generator of the comparison system, the first reference voltage.

12. The method of claim 7 further comprising:

in response to presence of the foreign object being declared, the comparison system performs at least one of:

(i) sounding an audible alarm, (ii) actuating a visual alarm, and (iii) transmitting an alert to an operator of the vehicle.

13. The wireless power transfer system of claim 1 wherein the comparison system is configured to declare the presence of the foreign object in response to at least one of (i) the first signal indicating that the difference between the first voltage and the first reference voltage exceeds the threshold value and (ii) the second signal indicating that the difference between the second voltage and the second reference voltage exceeds the threshold value.

14. The method of claim 7 further comprising declaring, with the comparison system, the presence of the foreign object in response to at least one of (i) the first signal indicating that the difference between the first voltage and the first reference voltage exceeds the threshold value and (ii) the second signal indicating that the difference between the second voltage and the second reference voltage exceeds the threshold value.

* * * * *